United States Patent [19]
Hark

[11] 4,229,969
[45] Oct. 28, 1980

[54] APPARATUS FOR MAKING WAVES IN A BODY OF LIQUID

[76] Inventor: William B. Hark, "The Paddocks" Frith La., Mill Hill, London, England, NW7 1PS

[21] Appl. No.: 19,761

[22] Filed: Mar. 12, 1979

[51] Int. Cl.³ .................................. G01M 10/00
[52] U.S. Cl. .................................................. 73/148
[58] Field of Search .................... 73/148; 4/172.16; 405/78; 416/79-83

[56] References Cited

U.S. PATENT DOCUMENTS

| | | | |
|---|---|---|---|
| 2,663,092 | 12/1953 | Laurent et al. | 73/148 |
| 3,793,534 | 2/1974 | Richard et al. | 73/148 |

FOREIGN PATENT DOCUMENTS

| | | | |
|---|---|---|---|
| 484431 | 12/1975 | U.S.S.R. | 73/148 |
| 534665 | 2/1977 | U.S.S.R. | 73/148 |

*Primary Examiner*—S. Clement Swisher
*Attorney, Agent, or Firm*—Harrington A. Lackey

[57] ABSTRACT

The invention relates to apparatus for making waves in a liquid in test tanks and the like by the back and forth movement in the liquid of a displacer. A problem caused by the escape of liquid round the side of the displacer during such movement is overcome by the provision of a seal between the displacer and the wall of the tank, which seal by a rolling action allows relative movement between the wall and the displacer.

5 Claims, 4 Drawing Figures

APPARATUS FOR MAKING WAVES IN A BODY OF LIQUID

This invention relates to apparatus for making waves in a body of liquid, more usually the liquid contained in a test tank.

Test tanks are commonly provided in universities and research establishments for the testing of model ships and marine structures and it is usually the case that such tanks are provided with apparatus for making waves of predetermined characteristics. Such apparatus comprises a displacer mounted for back and forth movement in order to create the waves in the body of liquid. Depending upon the stroke and frequency of movement of the displacer, so waves of predetermined characteristics (wave height:period) are created. It is known to provide for variation of the stroke and frequency for the displacer movement, in order that the apparatus can create wave patterns over as wide a spectrum of wave patterns as possible and it is also known to provide control for the displacer drive in order to adapt the apparatus so that it can absorb waves which are reflected to the apparatus and which would otherwise create interference on the wave pattern.

The present invention is concerned with the mounting of the displacer. Conventionally, the displacer is placed in the body of liquid and in the tank and whilst the displacer does create wave patterns when appropriately displaced, the liquid flows past the side of the displacer and to the rear of the active face thereof, which creates difficulties concerning the loading on the displacer, and in general is undesireable.

According to the invention, a wave making apparatus comprises a displacer having one active face and for positioning in a body of liquid, means for moving the displacer so that it can execute a back and forth movement so that the active face can create a wave pattern in the body of liquid and including flexible seal means adapted to seal the side edges of the displacer active face to prevent the liquid from flowing past the sides of the displacer when the apparatus is in use.

The said active face is preferably flat.

The seal means may be adapted to be sealingly connected to the sides of a test tank in which the apparatus is mounted, or it may be adapted for connection to similar displacers (of other wave making apparatus) adjacent the said side edges of the displacers. The back and forth movement of the displacer may be relative to the sides of a paddle means which itself is arranged for back and forth movement in the body of liquid to create waves therein, and the same means may be adapted to be sealingly connected adjacent the sides of said paddle means.

The seal means may be a rolling seal means in the form of a sealing sheet portion at each side of the active face of the displacer which rolls over and unrolls as the displacer moves back and forth.

The apparatus may include any conventional control means for controlling the movement of the displacer, including a facility for absorbing reflected waves.

Embodiments of the invention will now be described, by way of example, with reference to the accompanying drawing, wherein.

Figure 1:
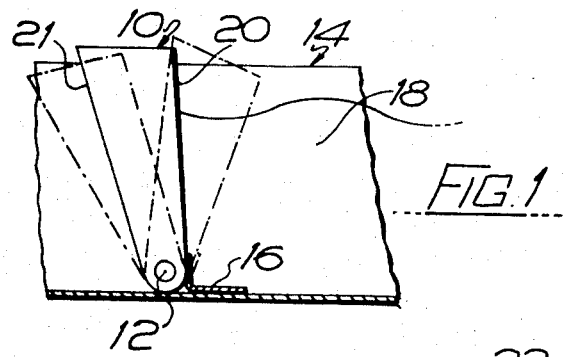
FIG. 1 is a side elevation showing a displacer in a test tank.
Figure 2:
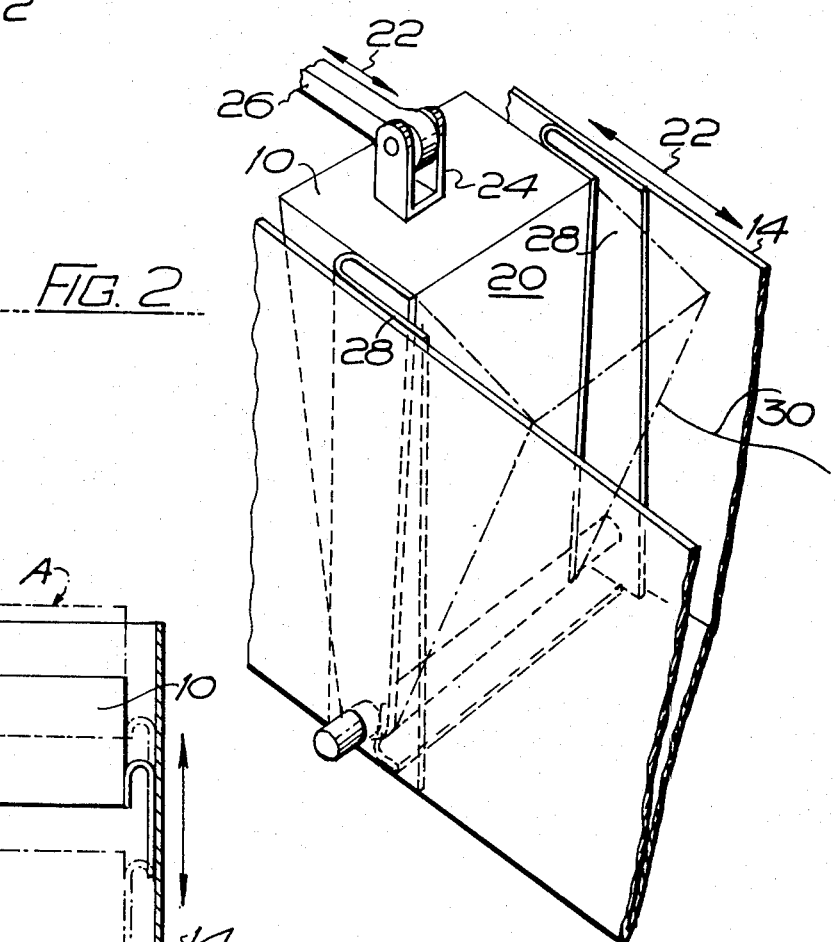
FIG. 2 is a perspective view showing the displacer shown in FIG. 1.
Figure 3:
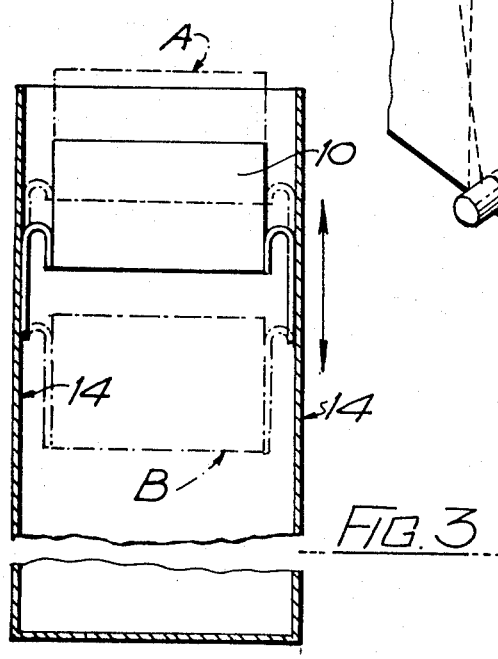
FIG. 3 is a plan of the displacer shown in FIGS. 1 and 2.

Referring to FIGS. 1 to 3 of the drawings, these show a displacer of apparatus according to one embodiment of the invention, the displacer being indicated by numeral 10. The displacer is a wedge shaped body arranged to be pivoted about pivot 12 located at the narrower end of the body, and is arranged in the test tank 14 so that the narrower end of the body is at the bottom of the tank, and the bottom end of the body is sealed to the bottom of the tank by a seal 16 to prevent the passage of liquid from the body 18 of liquid, under the body 10 and to the rear face as opposed to the active face 20 of the displacer 10. FIG. 1 shows diagrammatically how the displacer 10 can be moved between extreme positions indicated in dotted lines, and to this end the apparatus includes a means for so displacing the displacer 10 back and forth between said positions.

In FIG. 2 the arrows 22 indicate how the displacer 10 can be moved back and forth, and a bracket 24 is shown on the top of the displacer body 10, such bracket being coupled to an actuating rod 26 in turn connected to a suitable drive mechanism.

FIGS. 2 and 3 show how the sides of the tank 14 lie adjacent the sides of the displacer 10. Normally the liquid of the body of liquid 18 could pass freely between the sides of the displacer 10 and the sides of the tank 14. However, according to this embodiment of the invention, flexible rolling seal means are arranged to prevent such flow of liquid past the displacer 10 and such flexible seal means are shown as two separate flexible sheets 28 arranged to as to be folded upon themselves in the normal calm water position of the displacer 10, as shown clearly in FIG. 2. The respective edges of the sheets 28 are sealed to the body 10 and the respective sides of the tank 14 to prevent flow of liquid past the said edges of the active face 20 of the displacer.

FIG. 3 shows clearly how the seals 28 operate to unroll and to roll up by folding action as the displacer 10 rocks between its two extreme positions indicated by numerals A and B in FIG. 3 as the displacer 10 is moved back and forth to create waves, such as waves 30 shown in FIG. 2, in the body 18 of liquid in the tank 14.

The arrangement described shows a single displacer body 10 but it is to be understood that in a large test tank there may be a plurality of such displacers 10 and of course the seals 28 can be arranged between adjacent displacers.

Although a pair of seals have been shown in this example, in a modified arrangement of single flexible sheet extending over the entire surface of active face 20 and beyond is arranged so that the projecting edge portions forms the seals 28 illustrated in the accompanying drawings.

Although we have described a pivot for the displacer which is a member defining an axis, an alternative embodiment of the displacer may be mounted in the tank by a resilient arrangement or other suitable means.

Figure 4:
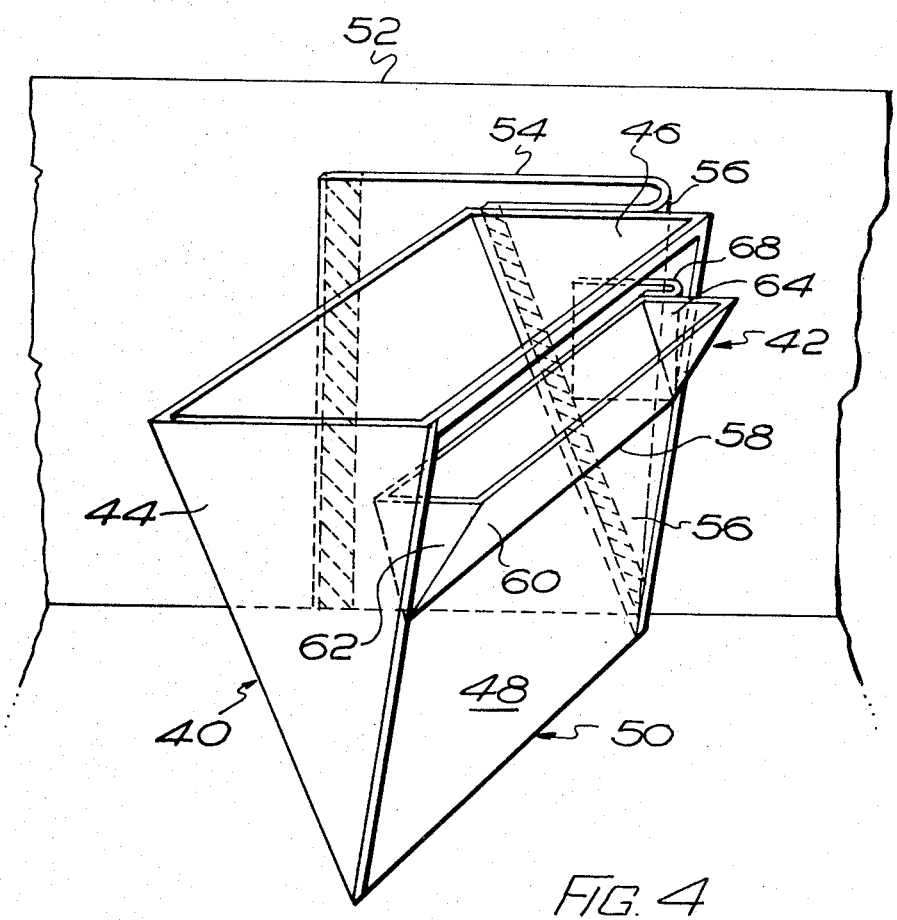
FIG. 4 is a perspective view of a different form of displacer.

The embodiment shown in FIG. 4 is of a wavemaker displacer of a type used to overcome displacement matching difficulties where the wavelength to be generated is long compared with the depth of the water. The displacer comprises a wedge-shaped main paddle 40 carrying an auxiliary flap 42.

The main paddle 40 comprises a pair of triangular side plates 44, 46 and a lower active displacer face 48 and is mounted for rocking about an axis coincident with or adjacent to bottom edge 50. Side wall 46 is sealingly connected to inside of wall 52 of a test tank by means of rolling seal 54 of flexible material impervious to water which is folded at 56 and secured to the wall and the side plate only at its edges (shown cross-hatched in the figure) so as to permit the rocking movement of the paddle by a rolling movement of the fold 56. The sealing arrangement is thus similar to that described in relation to the embodiment of FIGS. 1–3 except that the fold 56 is forward of the paddle and not rearward as in the other embodiment.

It is to be observed that the extent of the rocking movement of the paddle permitted by the sealing arrangement is determined by the sum of the lengths of the seal 54 from its fold 56 to its respective secured edges.

The opposed side 44 is similarly sealed by a folded seal (not shown) between itself and a parallel structural element which may be in a simple arrangement a further wall of the tank, but which in a more practical arrangement may be one of a series of perhaps 100 similar paddles, independently rockable, extending in a row across the tank. Each of the paddles of such a row, apart from the end ones, is sealingly secured to the two adjacent paddles in the row.

Above active face 48, displacer flap 42 is mounted on the paddle for pivoting about hinge line 58 under the action of conventional motive means (not shown) independent of means provided for rocking the main paddle. The flap has its own displacingly active face 60 extending between side plates 62 and 64 which lie in planes parallel to plates 44 and 46 respectively whereby the flap can either project outwardly from paddle 40 as shown or retract within the paddle. A folded rolling seal 68 is provided between the outer surface of side plate 64 and the inner surface of side plate 46 whilst a further seal (not shown) is provided between side plates 62 and 44; both seals are similar in construction and mounting as seal 54 already described.

I claim:

1. Apparatus for making waves in a body of liquid comprising a container for the liquid, including a longitudinal dimension and opposed inner surfaces spaced apart transversely, displacing means having an active face disposed substantially transversely between said inner surfaces, said active face having opposed sides means for moving said displacing means longitudinally back and forth in said container between said opposed inner surfaces, so that said active face, in motion, creates a wave-pattern in the liquid, and further including flexible seal means between said sides and said opposed inner surfaces, to prevent liquid from flowing between said sides and said corresponding inner surfaces.

2. The invention according to claim 1 in which said displacing means comprises at least two independently movable displacers arranged side-by-side in said container, and further including flexible seal means between opposed sides of adjacent displacers to prevent liquid from flowing between adjacent displacers.

3. The invention according to claim 1 in which said displacing means comprises a pair of opposed side walls, at least one auxiliary displacing flap having opposite edges, means mounting said displacing flap between the side walls of said displacing means for longitudinal movement back-and-forth relative to said displacing means, and further comprising additional flexible seal means between the side edges of said at least one auxiliary displacing flap and the opposed side walls of said corresponding displacing means.

4. The invention according to claim 1 in which said seal means comprises a rolling seal in the form of a sealing sheet portion having a folded edge which moves rollably in substantially the same longitudinal back-and-forth direction as said displacing means, while said displacing means is in motion.

5. The invention according to claim 1 in which said active face is flat.

* * * * *